April 28, 1936.  W. SCHULTE  2,039,262
PROCESS FOR THE MANUFACTURE OF THREADS,
STRINGS, BANDS, FILMS AND THE LIKE
Filed Feb. 7, 1934  2 Sheets-Sheet 2
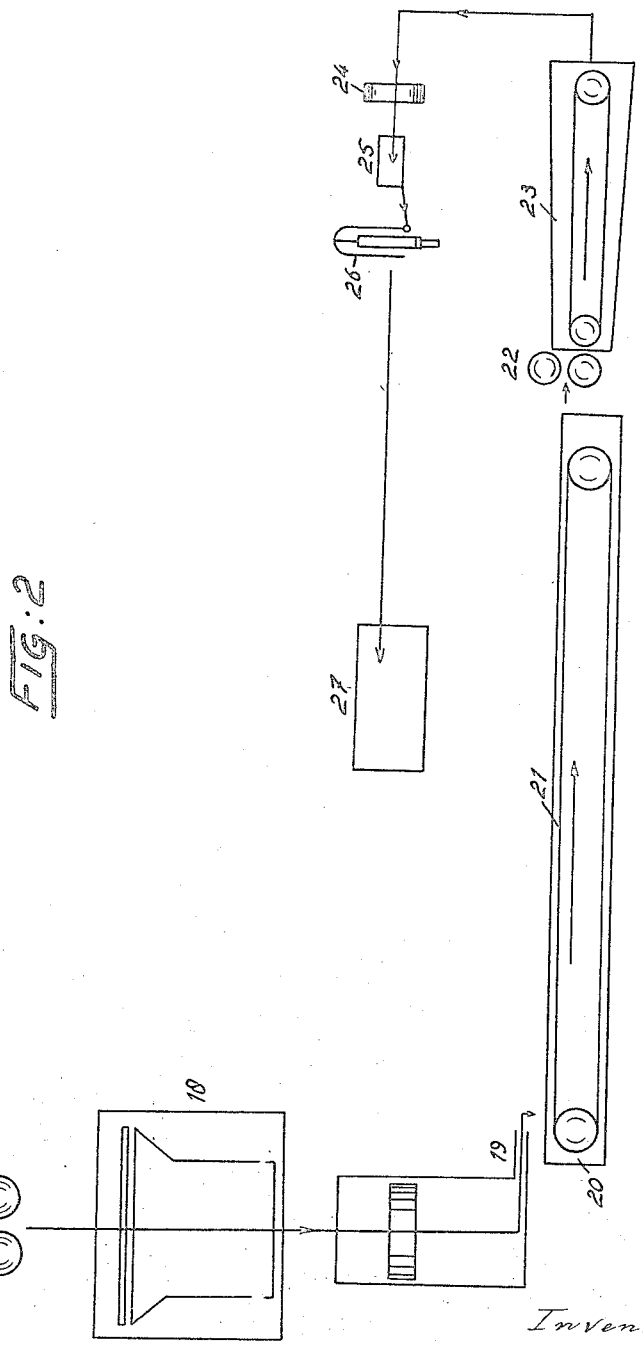

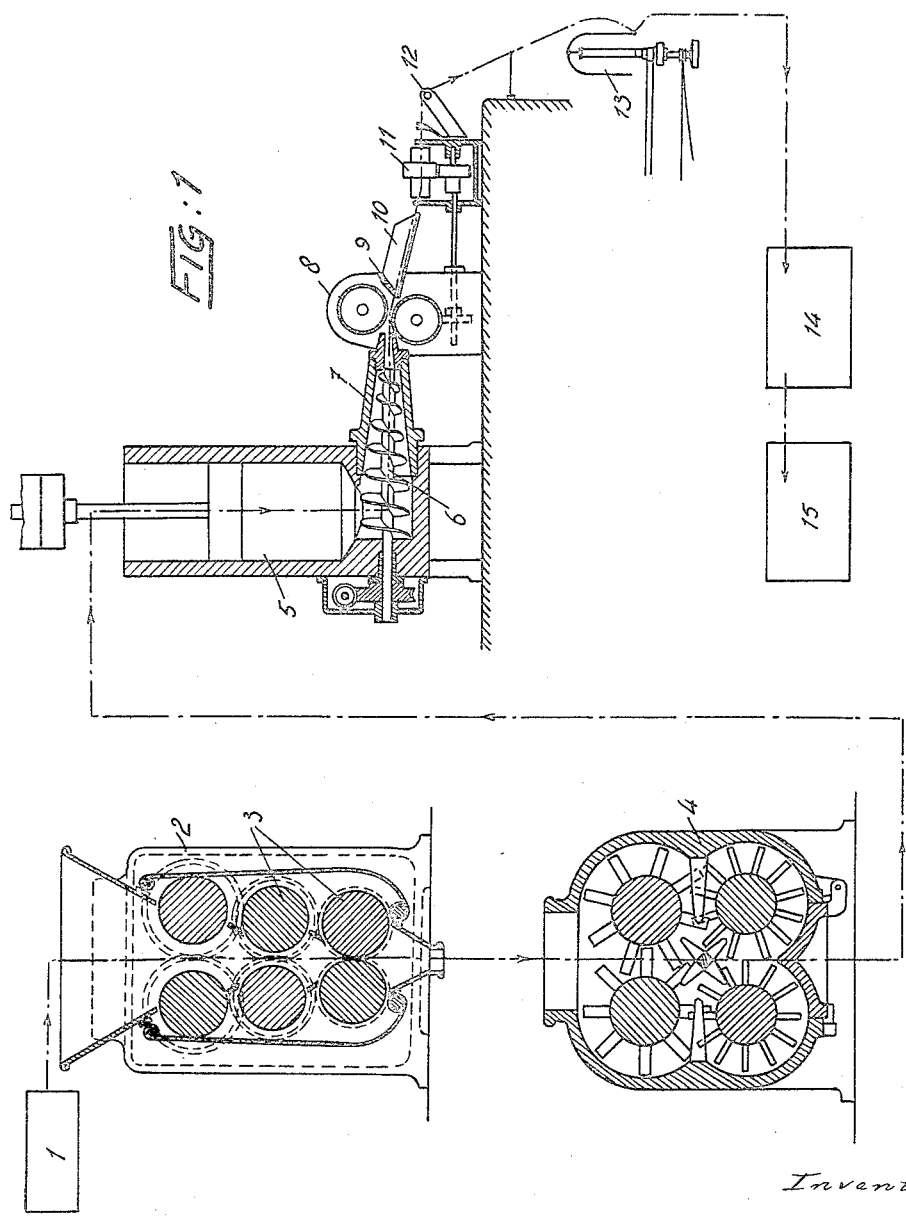

Patented Apr. 28, 1936

2,039,262

UNITED STATES PATENT OFFICE 2,039,262

PROCESS FOR THE MANUFACTURE OF THREADS, STRINGS, BANDS, FILMS, AND THE LIKE

Wilhelm Schulte, Meppel, Netherlands, assignor to N. V. Koninklijke Pharmaceutische Fabrieken v/h Brocades-Stheeman & Pharmacia, Meppel, Netherlands, a limited-liability company of the Netherlands Application February 7, 1934, Serial No. 710,184
In the Netherlands February 11, 1933

24 Claims. (Cl. 18—54)

This invention relates to a process and apparatus for the manufacture of threads, strings (for instruments), bands, films and the like, for example surgical suture material, strings for violins, rackets and the like, from elastin-containing and/or coleagenous animal fibres or materials containing the same, and to the resulting products.

For the purpose of stitching up wounds, for example incisions effected during operations, surgeons employ a special suture material, which serves the purpose of keeping the edges of the wound together until the latter is healed. For deep sutures a material is employed, which is reabsorbed by the organism after a certain time. Reabsorbable suture material has the great advantage that it gradually disappears and need not, therefore, be removed from the stitching channels, when the wound is healed.

Hitherto a suture material, prepared by a very complicated process from intestines, has been almost exclusively employed, the starting material being the intestine, or more exactly the small intestine, of the wether, from which a suture thread about 2½ metres long suitable for operation purposes can be prepared.

The application of this intestinal gut is, however, attended with great difficulties. In the first place it is impossible to guarantee with any certainty that the gut is free from germs or micro-organisms. The gut, further, does not always show sufficient tensile strength.

A substitute for intestinal gut has therefore been sought for many years and it was thought that this had been found in animal fibres, such as sinews, flesh and the like, which are in themselves free from, or relatively free from germs, or which can be easily sterilized. This starting material was first teased out or separated from fibres and thereafter spun in the manner usually employed in the textile industry, i. e. by the dry method, the different operations being carried out under aseptic conditions. Not only was surgical suture material obtained in this way, but also strings for violins, rackets and the like.

It has already been proposed to pretreat fresh flesh, sinews, skins or the like in another manner, by disintegrating the starting material in a flesh pulp or paste and pressing this mass through nozzles.

Finally a method has also been described, in which keratin, collagen and gluten, or animal material containing these substances, are brought into solution and are thereafter coagulated in the form of fibres and the like. Solution is effected by ammoniacal solutions of heavy metal salts and coagulation with acids. An essential feature of the process is, however, that any fibrous structure present at the commencement is entirely destroyed during the process of dissolving the material.

Great difficulties were, however, encountered in the application of all these known processes. Rational production was not possible, while the resulting threads were unsatisfactory in quality. In spite of many attempts, no satisfactory method has been developed as evidenced from the fact that even now reabsorbable surgical suture material is exclusively manufactured from wether intestines.

The present invention relates to a new method for manufacturing threads, strings (for instruments), films and the like, for example surgical suture material, strings for violins, rackets and the like, from elastin-containing and/or collagenous animal fibres or materials containing the same.

The present invention is based on the concept that in order to manufacture products of exceptional quality, on the one hand, the fibrous structure of the starting material must be maintained and, on the other hand, the individual fibres must be brought into better combination with one another than hitherto.

According to the invention the desired aim is attained by preparing a suspension of the teased out starting materials and pressing this suspension through nozzles. In this way the difficulties attending the known processes are avoided and products are obtained which, in addition to other desired properties, possess great tensile strength.

The fibre suspension may be prepared in different ways. Thus, for example, the starting material may be first mechanically teased out or separated into fibres, the greatest care being taken to ensure that the fibrous structure remains unchanged, and the teased out material thereafter suspended in such a quantity of a suitable liquid, such as water, an acid reacting solution, for example a rivanol solution and the like, that the desired concentration of the fibres is obtained. A homogenizing apparatus is required for the purpose.

An alternative method of preparing the suspension, which is frequently preferred, is as follows:

The starting material, for example sinews, is first allowed to swell in a swelling agent, preferably until a mass herein defined as apparently homogeneous is formed, whereby the fibres are loosened from their association. Care must be taken thereby to ensure that not only the fibrous structure is retained during the swelling process, but also that the action of the swelling agent is not so strong that the fibres are damaged to such an extent that the strength elasticity and reabsorbing powers of the fibres would be appreciably detrimentally influenced. A swollen mass obtained in this way has been defined above as "apparently homogeneous" in contrast to a "homogeneous mass", which is obtained by bringing a substance into true or colloidal solution.

The next operation is the separation into fibres, with the aid of which a fibre suspension is obtained, in which the individual fibres are uniformly distributed. It is particularly important that the elementary fibres should as far as possible retain their length, since the strength of the finished products depends upon the length of these elementary fibres. If, for example, the starting material is ground in a colloid mill and if the fibrous structure is destroyed in this way, a solid product is obtained in the further process of working up, but this product possesses practically no tensile strength.

In order to prepare the suspension with the desired concentration of fibres, the process of swelling and separating into fibres may be effected in the quantity of swelling agent required for the purpose. An alternative procedure, however, and one which is frequently preferred, is first to allow the starting material to swell in a small quantity of swelling agent and to tease it out therein and, during or after the separation into fibres, to introduce the still required quantity of swelling agent, having the same or another concentration.

Dilute solutions of organic or inorganic acids or acid-reacting compounds, for example solutions of lactic acid, formic acid, phosphoric acid, hydrochloric acid, potassium or sodium bisulphate, potassium bi-oxalate and potassium tetra-oxalate, are very suitable as swelling agents. The most advantageous concentration of these substances in the swelling bath depends upon the nature of the agent employed and, probably, chiefly on the hydrogen ion concentration thereof. Thus experiments with solutions containing 2.5% of lactic acid, 2.3% of formic acid and 0.125% of phosphoric acid have yielded excellent results. All these solutions have a pH value of about 2. It was correspondingly found that a hydrochloric acid solution of 0.01 N behaves in exactly the same way.

The invention is, of course, not limited to the use of solutions having a pH value of about 2. The hydrogen ion concentration may be less or even greater than the value indicated. Baths having a pH value between about 1.3 and 2.5 are preferred. Thus when employing hydrochloric acid, a concentration of 0.04 N may be employed. With substantially higher concentrations of this acid, however, the swelling process proceeds less satisfactorily.

The now finished fibre suspension is thereafter pressed through nozzles, the cross-section of which is adapted to the purpose in view, and further worked up. Various procedures may be adopted thereby depending upon the nature of the fibre suspension.

The fibrous mass discharging from the nozzles may for example be introduced between rollers, which exert a certain pull on the product formed. These rollers may be heated in order slightly to dry the product rolled out in the form of a band. The actual spinning process is thereafter effected with the aid of apparatus known in the textile industry with the difference that all operations from the separation into fibres to the end can if desired be effected continuously.

The above procedure is particularly suitable if fibre suspensions are being treated, which have been prepared in the manner first described, viz. by teasing out the starting material and suspending the individual fibres in a liquid.

The diameter of the resulting threads depends largely on the concentration of dry substance in the suspension. These concentrations may vary substantially. Suspensions, which contain about 1 to 15 grams of dry substance per 100 cubic centimeters of suspension, are preferably employed in the above described process.

If, however, the fibre suspension has been prepared by swelling the starting material and thereafter effecting separation into fibres it is advisable to adopt the following mode of operation:

The suspension is pressed, if desired after sieving into a "shrinking bath". The water which has entered the fibres during the swelling process, is (probably) again removed by the action of this bath, whereby the fibres shrink and again separate out. The shape of the resulting product is chiefly determined by the shape of the nozzle through which the material is pressed. The separated products are thereafter further worked up in a manner known per se.

As soon as most of the water has been removed from the separated products, the latter show a remarkable strength, which is of course still further substantially increased by the following drying process and if desired subsequent treatment. The threads produced in this manner are transparent and closely resemble threads, which have been manufactured from wether intestines, the only difference being that the threads according to the invention are very considerably stronger and can be manufactured absolutely sterile.

The diameter of the resulting product is in this case also dependent upon the concentration of the fibres in the suspension. This concentration can be easily regulated by adjusting the quantity of the swelling agent whereby, for example, thick to very thin threads can be produced. The following will serve as an example:

The fibre suspension can be diluted in such a way that only 12 mgms. of dry fibrous material are contained in 100 cubic centimetres of suspension. Threads having a diameter of 0.05 mm. can be prepared in the described manner from such a mass. These threads nevertheless show substantial strength. If desired, still thinner threads may be prepared. Thicker threads may be prepared by spinning more concentrated suspensions, containing, for example, 10 gms. or more of dry substance per 100 cubic centimetres of suspension, or by twisting several individual fibres together.

Operating with a thinner fibre suspension has the advantage that subsequent pressing of the mass through nozzles takes place more uniformly, so that a more uniform product is also obtained. Further, the shrinking liquid acts substantially more uniformly on the fibrous mass, so that the liquid has more than a superficial effect on the mass and the product becomes more homogeneous.

Acid-fixing substances, for example alkalies or alkaline-reacting compounds, such as ammonia, sodium bicarbonate and the like, are particularly adapted as shrinking liquids. These substances are preferably employed in dilute solutions. Thus, when employing 0.01 N hydrochloric acid as swelling agent 0.03% ammonia (about 0.017 N) or a 0.08% solution of sodium bicarbonate (about 0.01 N) has proved to be a very suitable shrinking agent. The aforementioned substances in the above indicated concentrations in no way detrimentally influence the products formed with regard to their reabsorbability, strength and elasticity.

The starting material, for example sinews, skins and the like, may be removed from the body of the animal under sterile conditions and be maintained under aseptic or antiseptic conditions during the entire treatment. It is, of course, also possible to effect sterilization at any desired stage of the operation, for example at the end. In this way an absolutely germ-free and guaranteed material, which is completely reabsorbable, is obtained. The products prepared according to the present process, moreover, show very great strength, which is due to the special treatments, to which the starting material has been subjected, viz. working up to a suspension, whilst maintaining the structure of the fibres, and again separating the fibres from the suspension. It is due to these properties that threads, prepared in this manner, form a superior surgical suture material to the known catgut prepared from intestines.

The threads prepared according to the invention may of course also be woven into fabrics and both the threads and the fabrics may be impregnated with suitable chemicals, for example cumene, iodine and the like. They may further be tanned, for example with alum, or hardened, for example with formaldehyde. The threads or the fabrics prepared therefrom may also be coloured.

If it is desired to manufacture strings, bands, films or the like for other than medical purposes, it is, of course, not necessary to operate under sterile conditions or to effect sterilization. The drying taking place during the preparation is sufficient to prevent decomposition.

The already considerable original strength of the products obtained in the manner described above may be extraordinarily increased by incorporating in them textile fibres, i. e. vegetable, animal or artificial fibres. For example, flax, rameh, wool fibres, furthermore artificial silk fibres, etc., may be used. This incorporating may be effected in various manners. The additional fibres may for instance be mixed with the elastin-containing and/or collagenous fibres in the same apparatus in which the fibre suspension is made. In case the additional fibres are very long, such as flax or rameh, they are suitably previously cut down to lengths of about 2–5 centimetres, because while having this length, they may during the homogenization process be better and more intimately mixed with the elastin-containing and/or collagenous fibres. The suspension of mixed fibres thus obtained may be processed in exactly the same manner as has been described with respect to the elastin-containing and/or collagenous fibres.

The elastin-containing and/or collagenous fibres may also be mixed with the textile fibres after the suspension of the first mentioned has been pressed through the nozzle. In this case, it is advantageous to use the textile fibres in the shape of a product which in the textile industry is known as a "fleece". Preferably, the textile fibres are worked between every two layers of elastin-containing and/or collagenous fibres, e. g. by placing upon an endless belt at first a layer of elastin-containing and/or collagenous fibres, covering this layer with a fleece, consisting of textile fibres, placing upon this latter a layer of elastine and/or collagene fibres and so on. The number of these layers is optional and may be in conformity with the purpose in view.

When the process is carried out in the manner indicated in the above paragraph and a shrinking bath is used, it is advisable to have the mass progress over a certain distance before introducing it into the shrinking bath, so as to intimately incorporate with the textile fibres the layers of elastin-containing and/or collagenous fibres. In the shrinking bath the elastin-containing and/or collagenous fibres are precipitated while at the same time being intimately united with the textile fibres. Practice has shown that it is advisable, especially when the textile fibres are incorporated in form of a fleece in the other fibres, to moisten the textile fibre fleece thoroughly before introducing it into the elastin-containing and/or collagenous fibre layer, so as to effect quicker incorporation. The further operations, such as drying, remain unaltered.

The products obtained from the mixed fibres may be subjected to the same aftertreatments as those which contain no textile fibres; especially the capacity of being tanned is not impaired by the presence of textile fibres.

The invention will now be further described, by way of example, with reference to the accompanying diagrammatic drawings, in which:

Fig. 1 shows an elevation partly in section of an apparatus suitable for carrying out one embodiment of the invention for the manufacture of surgical suture material, and Fig. 2 shows a similar view of an apparatus suitable for carrying out another such embodiment.

As starting material in both embodiments sinews, removed from the body of the animal under sterile conditions, are employed, all the operations hereinafter referred to being carried out under aseptic conditions.

Referring to Fig. 1 of the drawings:

The sinews, after the adhering portions of mucous membrane have been removed, are cut into slices and introduced into the container 1. The material leaving the container 1 is crushed between the pairs of rollers 2 and 3, which are provided with a smooth or grooved surface, coarse crushing being effected at 2 and fine crushing at 3. The passage of the material from the first to the second pair of rollers is effected positively with the aid of guides.

The crushed material is thereafter introduced, together with the aseptic liquid, into a teasing-out machine 4, for example a hammer mill or beating mill and is broken down therein into its finest elementary fibres. The suspension may be prepared in the same apparatus, by adding the suspension liquid and causing the rotating parts to rotate at greater speed than during the teasing-out process. The finished worked up material passes from this apparatus, together with the aseptic liquid, into a press cylinder 5, in which the pressure, necessary for compressing the material in uniform amount through the nozzle 7, is applied to the material by a piston. The shape of the nozzle 7 is adapted to the desired cross section of the product to be formed. A conveying device 6, for example a conical conveying screw, may be disposed in the nozzle 7. The number of nozzles and conveying devices, if such are used, attached to the press cylinder 5, is determined by the desired number of individual threads. In the drawings only one conveying device, with all further devices connected thereto, is shown.

The conveying device 6 operates in such a way that the material is introduced and pressed through the nozzle absolutely uniformly and that the excess of aseptic liquid, which is no longer required for the following operations, or might hinder the same, is separated.

The product, shaped in accordance with the cross section of the nozzle, passes from the expressing device 7 positively between a pair of rollers 8, which may be heated, for example by steam or electrically. The speed of rotation of the pair of rollers is so regulated that the material passing therethrough is subjected not only to compression, but also to a pulling or stretching action. The cord-like material is slightly predried by the heated rollers. The cord is thereby stretched between the nozzle and the rollers, and between the rollers is spread out into a ribbon or band, compressed and slightly dried on the surface. This drying must, however, not be too severe; a moisture content between 30% and 40% is with advantage retained in the band.

The band or ribbon of material then passes through a loop or other suitable device 9, where it acquires a preliminary twist. The pre-twisted cord passes along a groove or channel 10 to a device 11 for completing the twist, where it acquires the form of a thread. The pull exerted on the cord by the twisting device 11, is so regulated that further stretching of the cord is effected between the pair of rollers 8 and twisting device 11. In order to prevent the thread from untwisting, it is conveyed over a stationary device 12, from which it passes into a doubling device 13, in which one combined thread is produced from several individual threads. Depending upon the desired thickness of the combined thread, two or more individual threads are joined into one combined thread.

The threads may be treated in the manner hereinbefore described in suitable aseptic liquids in baths 14 and 15, whereby the requisite strength and durability is obtained after drying.

Referring to Fig. 2 of the drawings:

The sinews are introduced into a suitable swelling agent, for example a 2½% solution of lactic acid, in the container 16. After the sinews are sufficiently swollen and consequently the connecting substance between the individual fibres has been sufficiently loosened, the material is crushed between rollers 17 and thereafter separated into elementary fibres in a teasing out device 18.

After teasing out, more swelling agent, for example ½% lactic acid, is added, in such a quantity that the desired concentration of fibres is obtained in the suspension. The suspension is thereafter injected through nozzles 19 of the desired shape into a shrinking bath 20. An endless belt 21 with advantage travels in this bath, onto which the suspension is sprayed and which conveys the fibrous mass, separated out in the form of a thread, through the bath. A 1% ammonia solution is, for example, employed as shrinking liquid.

The shrinking liquid may act on the fibrous mass from above, or, if the belt is constructed in the form of a sieve, may also act through the sieve from below. The length of the belt depends upon the concentration of the shrinking liquid employed. Thus, for example, a 3% ammonia solution acts more rapidly and more intensively than a 1% solution.

The use of a belt is also of great importance for another purpose than passing the separated material through the bath. Thus, the individual fibres are mostly turned in the same direction, so that they subsequently lie longitudinally in the thread or band, whereby strength and uniformity are favourably influenced.

The satisfactorily cohering fibrous mass passes from the belt to a device, in which the greater quantity of the liquid is expressed, for example between rollers 22. The fibrous mass is thereafter introduced into the drying device 23, where the water content is still further reduced.

It has been proved suitable to utilize a single endless belt (e. g. a sieving belt) for conveying the fibrous material through the shrinking bath 21, the rollers 22 and the drying device 23.

The fibrous mass, obtained in this way, is thereafter twisted together to a thread in the device 24 and further dried in a stretched condition in the device 25. If it is desired to prepare stronger threads, several individual threads are twisted together in the device 26 to a stronger combined thread.

If desired, the thread may be thereafter further passed through one or more baths, in which, depending upon the purpose in view, it may be treated with different substances. Such a bath 27 may, for example, contain chemicals, such as cumene, solution of iodine in potassium iodide, alcohol, alum and the like.

What I claim is:

1. A process for the manufacture of products from elastin-containing or collagenous animal fibrous materials, which comprises preparing a suspension of the elementary fibers of the said materials in a liquid, and forming desired products from the suspension.

2. A process for the manufacture of products from elastin-containing or collagenous animal fibrous materials, which comprises preparing a suspension of elementary fibers of the said materials in a liquid, and extruding the said suspension to produce products of desired form.

3. A process for the manufacture of products from elastin-containing or collagenous animal fibrous materials, which comprises swelling said materials in a swelling agent while maintaining the fibrous structure and without substantial damage to the fibers, teasing out said swollen materials to form a suspension of elementary fibers, and forming desired products from the suspension.

4. A process for the manufacture of products from elastin-containing or collagenous animal fibrous materials, which comprises swelling said materials in a swelling agent while maintaining the fibrous structure and without substantial damage to the fibers, teasing out said swollen materials to form a suspension of elementary fibers, and extruding the suspension to produce products of desired form.

5. A process for the manufacture of products from elastin-containing or collagenous animal fibrous materials, which comprises swelling said materials in a dilute solution of an acid-reacting compound while maintaining the fibrous structure and without substantial damage to the fibers, teasing out said swollen materials to form a suspension of elementary fibers, and extruding the suspension to produce products of desired form.

6. A process for the manufacture of products from elastin-containing or collagenous animal fibrous materials, which comprises swelling said materials in a dilute solution of lactic acid while maintaining the fibrous structure and without substantial damage to the fibers, teasing out said swollen materials to form a suspension of elementary fibers, and extruding the suspension to produce products of desired form.

7. A process for the manufacture of products from elastin-containing or collagenous animal fibrous materials, which comprises swelling said materials in a dilute solution having a pH value within the range 1.3 to 2.5 while maintaining the fibrous structure and without substantial damage to the fibers, teasing out said swollen materials to form a suspension of elementary fibers, and extruding the suspension to produce products of desired form.

8. A process for the manufacture of products from elastin-containing or collagenous animal fibrous materials, which comprises swelling said materials in a swelling agent while maintaining the fibrous structure and without substantial damage to the fibers, teasing out said swollen materials to form a suspension of elementary fibers, extruding the suspension to produce products of desired form, and subjecting the products to the action of a shrinking agent.

9. A process for the manufacture of products from elastin-containing or collagenous animal fibrous materials, which comprises swelling said materials in a dilute solution of an acid-reacting compound while maintaining the fibrous structure and without substantial damage to the fibers, teasing out said swollen materials to form a suspension of elementary fibers, extruding the suspension to produce products of desired form, and subjecting the products to the action of a dilute solution of an acid-fixing substance.

10. A process for the manufacture of products from elastin-containing or collagenous animal fibrous materials, which comprises swelling said materials in a dilute solution of an acid-reacting compound while maintaining the fibrous structure and without substantial damage to the fibers, teasing out said swollen materials to form a suspension of elementary fibers, extruding the suspension to produce products of desired form, and subjecting the products to the action of a dilute solution of ammonium hydroxide.

11. A process for the manufacture of products from sinews, which comprises preparing a suspension of elementary fibers of the sinews in a liquid, and extruding the said suspension to produce products of desired form.

12. A process for the manufacture of products from sinews, which comprises swelling said sinews in a swelling agent while maintaining the fibrous structure and without substantial damage to the fibers, teasing out said swollen sinews to form a suspension of elementary fibers, and extruding the suspension to produce products of desired form.

13. A process for the manufacture of products from sinews, which comprises swelling said sinews in a dilute solution of an acid-reacting compound while maintaining the fibrous structure and without substantial damage to the fibers, teasing out said swollen sinews to form a suspension of elementary fibers, and extruding the suspension to produce products of desired form.

14. A process for the manufacture of products from sinews, which comprises swelling said sinews in a swelling agent while maintaining the fibrous structure and without substantial damage to the fibers, teasing out said swollen sinews to form a suspension of elementary fibers, extruding the suspension to produce products of desired form, and subjecting the products to the action of a shrinking agent.

15. A process for the manufacture of products from sinews, which comprises swelling said sinews in a dilute solution of an acid-reacting swelling agent while maintaining the fibrous structure and without substantial damage to the fibers, teasing out said swollen sinews to form a suspension of elementary fibers, extruding the suspension to produce products of desired form, and subjecting the products to the action of a dilute solution of an acid-fixing substance.

16. A process for the manufacture of products from sinews, which comprises swelling said sinews in a dilute solution of an acid-reacting swelling agent while maintaining the fibrous structure and without substantial damage to the fibers, teasing out said swollen sinews to form a suspension of elementary fibers, extruding the suspension to produce products of desired form, and subjecting the products to the action of a dilute solution of ammonium hydroxide.

17. A process as claimed in claim 1, which comprises incorporating textile fibers in the articles to be manufactured from elastin-containing or collagenous animal fibrous materials.

18. A process for the manufacture of products from elastin-containing or collagenous animal fibrous materials, which comprises preparing a suspension of the elementary fibers of the said materials and of textile fibers in a liquid, and extruding the suspension to produce products of desired form.

19. A process for the manufacture of products from elastin-containing or collagenous animal fibrous materials, which comprises preparing a suspension of the elementary fibers of the said materials in a liquid, extruding the suspension to form layers of fibrous material, and working a fleece of textile fibers between every two layers of extruded fibrous material.

20. A process for the manufacture of products from elastin-containing or collagenous animal fibrous materials, which comprises swelling said materials in a swelling agent while maintaining the fibrous structure and without substantial damage to the fibers, teasing out said swollen materials to form a suspension of elementary fibers, forcing the suspension through an extrusion orifice to produce products of desired form, conveying the products away from the orifice, and subjecting the products while being conveyed to the action of a shrinking agent.

21. A process for the manufacture of products from elastin-containing or collagenous animal fibrous materials, which comprises crushing the fibrous materials, beating the crushed materials in the presence of a liquid until the same is broken down into elementary fibers, forming a suspension of the elementary fibers, and forming desired products from the suspension.

22. A process for the manufacture of products from elastin-containing or collagenous animal fibrous materials, which comprises crushing the fibrous materials, teasing out the crushed materials in the presence of a liquid into elementary fibers, forming a suspension of the elementary fibers, and extruding the suspension to form articles of the desired form.

23. As new articles of manufacture, products comprising synthetically assembled elementary fibers of elastin-containing or collagenous animal fibrous materials.

24. As a new article of manufacture, surgical suture material comprising synthetically assembled elementary fibers of sinews.

WILHELM SCHULTE.